(12) United States Patent
Bowers (10) Patent No.: US 7,624,835 B2
(45) Date of Patent: Dec. 1, 2009

(54) PROTECTIVE COVER FOR THE UNDERSIDE OF A VEHICLE

(75) Inventor: Lee N. Bowers, Springfield, OH (US)

(73) Assignee: Honda Motor Company, Ltd., Tokyo (JP)

( * ) Notice: Subject to any disclaimer, the term of this patent is extended or adjusted under 35 U.S.C. 154(b) by 245 days.

(21) Appl. No.: 11/395,717

(22) Filed: Mar. 31, 2006

(65) Prior Publication Data

US 2007/0228714 A1  Oct. 4, 2007

(51) Int. Cl.
 *B60K 23/00* (2006.01)
(52) U.S. Cl. .................. 180/346; 180/69.1; 280/770; 280/304.3
(58) Field of Classification Search ............. 180/346, 180/69.1; 280/770, 304.3, 160, 847, 850; 296/180.1; B62D 35/02
See application file for complete search history.

(56) References Cited

U.S. PATENT DOCUMENTS

| | | | | |
|---|---|---|---|---|
| 1,163,317 A | * | 12/1915 | Brush ......................... | 180/69.1 |
| 1,395,029 A | * | 10/1921 | Best .......................... | 180/69.1 |
| 1,824,255 A | * | 9/1931 | Bishop ....................... | 180/292 |
| 2,413,264 A | | 12/1946 | Swennes et al. | |
| 2,837,371 A | * | 6/1958 | McKee ........................ | 49/462 |
| 2,990,212 A | * | 6/1961 | Nicastro ...................... | 293/34 |
| 3,208,766 A | * | 9/1965 | Domes ................... | 280/124.17 |
| 3,455,409 A | * | 7/1969 | Clark ......................... | 180/271 |
| 3,599,742 A | | 8/1971 | Lowery | |
| 3,653,459 A | * | 4/1972 | Andrews ..................... | 180/69.1 |
| 4,193,468 A | | 3/1980 | Riddle et al. | |
| 4,465,300 A | | 8/1984 | Raidel, Sr. | |
| 4,534,440 A | * | 8/1985 | Sekizaki et al. ............ | 180/215 |
| 4,655,307 A | | 4/1987 | Lamoureux | |
| 5,076,387 A | * | 12/1991 | Oka .......................... | 180/215 |
| 5,327,989 A | | 7/1994 | Furuhashi et al. | |
| 5,794,976 A | | 8/1998 | Stevicks | |
| 5,915,728 A | | 6/1999 | Blackburn | |
| 5,924,270 A | | 7/1999 | Bruns | |
| 5,954,364 A | | 9/1999 | Nechushtan | |
| 5,992,926 A | | 11/1999 | Christofaro et al. | |
| 6,076,619 A | | 6/2000 | Hammer | |
| 6,145,860 A | | 11/2000 | Yu et al. | |
| 6,161,867 A | | 12/2000 | Tamura | |
| 6,202,778 B1 | | 3/2001 | Mistry et al. | |
| 6,435,298 B1 | * | 8/2002 | Mizuno et al. .............. | 180/346 |
| 6,516,907 B2 | | 2/2003 | Robinson | |
| 6,547,027 B1 | | 4/2003 | Kalhok et al. | |
| 6,575,522 B2 | * | 6/2003 | Borghi et al. ............ | 296/180.5 |
| 6,692,366 B1 | | 2/2004 | Savant | |

(Continued)

*Primary Examiner*—Lesley D Morris
*Assistant Examiner*—Maurice Williams
(74) *Attorney, Agent, or Firm*—Ulmer & Berne LLP (57) ABSTRACT

A protective cover for the underside of a vehicle is formed substantially from plastic and can provide a skid plate for the vehicle. The protective cover includes at least one fastening portion which is configured to facilitate attachment of the protective cover to the vehicle. In one embodiment, the protective cover includes a rib that is movable to matingly contact a feature on an underside of a vehicle so that loading from an impact is distributed in a predetermined manner. In another embodiment, the fastening portion includes an abutment wall that substantially transmits a shearing load from the protective cover to a vehicle. In yet another embodiment, the fastening portion is adjacent to an edge portion of the protective cover. The protective cover may be included in a vehicle.

17 Claims, 10 Drawing Sheets

U.S. PATENT DOCUMENTS

| | | |
|---|---|---|
| 6,726,273 B2 * | 4/2004 | Kruschhausen et al. ..... 296/204 |
| 6,834,634 B2 | 12/2004 | Lawrence |
| 6,890,010 B2 | 5/2005 | Bergman |
| 6,925,735 B2 | 8/2005 | Hamm et al. |
| 7,055,895 B1 * | 6/2006 | King et al. ................. 296/204 |
| 2002/0050413 A1 | 5/2002 | Renault |
| 2002/0093167 A1 * | 7/2002 | Jones et al. ............ 280/87.042 |
| 2003/0067179 A1 * | 4/2003 | Bastien et al. .............. 293/120 |
| 2003/0082989 A1 | 5/2003 | Hoeting et al. |
| 2003/0107239 A1 | 6/2003 | Votruba et al. |
| 2004/0041415 A1 | 3/2004 | Hamm et al. |
| 2005/0217912 A1 | 10/2005 | Kudo et al. |

* cited by examiner

PROTECTIVE COVER FOR THE UNDERSIDE OF A VEHICLE

TECHNICAL FIELD

The present invention is directed to a protective cover for attachment to the underside of a vehicle. The protective cover can comprise a skid plate to protect one or more components of the vehicle from being damaged by terrain obstacles passing beneath the vehicle.

BACKGROUND OF THE INVENTION

It is known to protect the underside of a vehicle with a protective cover formed from stamped sheet metal. The purpose of such a protective cover is to prevent or reduce the consequence of an impact between an object lying on the ground (herein sometimes referred to as a terrain obstacle) and features disposed on the vehicle's underside in circumstances where the ground clearance of the vehicle is insufficient to allow the features to pass thereover without contact. However, conventional steel protective covers are inadequate for multiple reasons including, for example, excessive weight and cost, inability to incorporate intricate or complex shaping, complexity of manufacture due to multiple parts being welded together, and requirement for corrosion protection and/or vibration and noise dampening. As such, a recent trend is to replace the conventional steel protective covers with similar protective covers made substantially of plastic.

Plastic protective covers overcome some of the various shortcomings of conventional steel protective covers, as plastic protective covers are more easily manufactured in complex shapes and are typically of reduced weight and cost as compared with steel protective covers. However, some conventional plastic protective covers fail to adequately protect features on the underside of a vehicle. These conventional plastic protective covers have shapes which are similar to those of the steel protective covers which they replace, but have relatively low tolerance for ground contact with rocks and obstacles having sharp edges. Also, although such protective covers flex readily and generally spring back, if pushed too far, they may tear before taking on much permanent deformation. Additionally, such protective covers offer less resistance to abrasion than steel, and provide reduced impact toughness at low temperatures.

Conventional protective covers are typically attached to a vehicle with fasteners, and the manner of attachment typically does not differ between such protective covers regardless of whether they are formed from metal or plastic. However, as conventional plastic protective covers typically have a similar shape to those conventional metal protective covers which they replace, and as conventional plastic protective covers are unable to absorb and transfer loads to a vehicle in the same manner as can conventional steel protective covers, it is typical that such conventional plastic protective covers can crack and/or creep, particularly at the fastening areas, when the conventional plastic protective covers are exposed to impacts from terrain obstacles. Upon cracking or creeping of a conventional plastic protective cover, the protective cover can lose its ability to protect the underside of a vehicle, the fasteners for the protective cover can lose torque and fall out, the protective cover can vibrate and make noise, and/or the protective cover can become snagged upon terrain obstacles.

Additionally, some conventional plastic protective covers are mounted upon a vehicle with fasteners such that the head of one or more of the fasteners is exposed to damage from contact with underlying objects. The likelihood of damage to such fasteners is escalated when the protective cover is used on an off-road type of vehicle such as an all terrain vehicle ("ATV"). Damaged fasteners can perform inadequately to secure a plastic protective cover to a vehicle and additionally can be difficult to remove during maintenance to features of the vehicle which are shielded by the protective cover. Additionally, damage to fasteners can necessitate replacement of the damaged fasteners, which accordingly results in additional expense to the vehicle's owner. Some conventional arrangements have attempted to resolve this problem such as by using internal wrenching fasteners such as Torx or Allen headed bolts. However, these arrangements are often still susceptible to damage and/or torque loss from ground contact. Other conventional arrangements include a relatively deep pocket formed near the center of the protective cover, wherein a bolt can be inserted into an aperture within this pocket and the head of the bolt can be sufficiently contained within the pocket such that it is unlikely to be damaged by terrain obstacles. However, it is usually difficult to install and remove bolts from such pockets which can thereby make installation and removal of such a protective cover difficult.

SUMMARY OF THE INVENTION

In accordance with one embodiment of the present invention, a protective cover is formed substantially from plastic and comprises a bottom surface, a top surface and at least one fastening portion configured to facilitate attachment of the protective cover to a vehicle. The protective cover also comprises a rib which is movable from a first position to a second position upon impact of the bottom surface against a terrain obstacle. The rib is shaped and configured to matingly contact a feature on an underside of a vehicle when the rib is in the second position so that loading from the impact is distributed in a predetermined manner.

In accordance with another embodiment of the present invention, a protective cover is formed substantially from plastic and comprises at least one fastening portion configured to facilitate attachment of the protective cover to a vehicle. The fastening portion comprises a mounting structure and an abutment structure. The abutment structure defines an abutment wall. The mounting structure is configured to accommodate a fastener for attachment of the protective cover to a vehicle. The fastening portion is configured such that the abutment wall is operable to contact a mounting wall provided upon a vehicle when the protective cover is mounted on a vehicle and to substantially transmit to a vehicle a shearing load imparted upon the protective cover by a terrain obstacle.

In accordance with yet another embodiment of the present invention, a protective cover is formed substantially from plastic and comprises at least one fastening portion that is adjacent to an edge portion of the protective cover and that includes a base and a wall. The base defines an aperture and has a base perimeter spaced from the aperture. The protective cover is configured for attachment to an underside of a vehicle via the aperture by a fastener including a head having a predetermined height and a predetermined width. The wall extends from the base around the base perimeter at a height greater than the predetermined height. The base has a width greater than the predetermined width.

In accordance with yet another embodiment of the present invention, a vehicle comprises a protective cover formed substantially from plastic. The protective cover comprises a bottom surface, a top surface and at least one fastening portion at which the protective cover is attached to the vehicle. The protective cover also comprises a rib formed in a portion of the top surface. The rib is movable from a first position to a second position upon impact of the bottom surface against a terrain obstacle. The rib is shaped and configured to matingly contact a feature on an underside of the vehicle when the rib is in the second position so that loading from the impact is distributed in a predetermined manner to the feature.

In accordance with yet another embodiment of the present invention, a vehicle comprises a protective cover formed substantially from plastic. The protective cover comprises at least one fastening portion at which the protective cover is attached to the vehicle. The fastening portion comprises a mounting structure and an abutment structure. The abutment structure defines an abutment wall. The mounting structure accommodates a fastener which attaches the protective cover to the vehicle. The abutment wall contacts a mounting wall provided upon the vehicle and is configured to substantially transmit to the vehicle a shearing load imparted upon the protective cover by a terrain obstacle.

In accordance with yet another embodiment of the present invention, a vehicle comprises a protective cover formed substantially from plastic. The protective cover comprises at least one fastening portion that is adjacent to an edge portion of the protective cover and that includes a base and a wall. The base defines an aperture and has a base perimeter spaced from the aperture. The protective cover is attached to an underside of the vehicle via the aperture by a fastener including a head having a predetermined height and a predetermined width. The wall extends from the base around the base perimeter at a height greater than the predetermined height. The base has a width greater than the predetermined width.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EMBODIMENTS

The present invention and its operation are hereinafter described in detail in connection with the views and examples of FIGS. 1-3, 3A-3B, and 4-9, wherein like numbers indicate the same or corresponding elements throughout the views. A protective cover in accordance with the present invention can be attached to the underside of a vehicle for providing protection for one or more features disposed on or accessible from the underside of the vehicle. For example, a protective cover can be provided upon any of a variety of vehicles including, for example, automobiles, trucks, vans, motorcycles, recreational vehicles, watercraft, aircraft, agricultural equipment, construction equipment, toys, or other power equipment. Features of a vehicle protected by a protective cover can include, for example, a final drive gear case, a transmission, a transfer case, exhaust components, a fuel tank, an oil pan, frame or body elements, and/or any of a variety of other items disposed on or accessible from a vehicle's underside. In certain embodiments, a protective cover can be configured as a skid plate for a vehicle. In other embodiments, the protective cover can provide a sump for containing fluids spilled by components of a vehicle, and/or can provide a shield for protecting flying debris and/or moisture for contacting components of a vehicle.

The protective cover is formed substantially of plastic, such as, for example, polypropylene, polyethylene, polystyrene, polyethylene-terepthalate, polyvinyl chloride, and blends and/or laminations thereof. The protective cover can have a thickness of from about two millimeters to about eight millimeters, but its thickness may vary based upon the intended location, configuration, and function of the protective cover upon the vehicle. For example, areas of the protective cover likely to contact the ground may be thickened to provide enhanced abrasion resistance. As such, enough thickness may be provided, in some embodiments, to allow material to be gradually worn away throughout the expected life of the protective cover upon a vehicle (which may coincide with the expected life of the vehicle itself). Other areas of a protective cover might also be thickened to offer added strength (e.g., in areas expected to sustain higher loads, such as a fastening portion described in greater detail below). In one particular embodiment of the present invention, most parts of a protective cover can have a thickness of about four millimeters. It will be appreciated that forming the protective cover from plastic reduces cost and weight as compared to conventional steel protective covers, eliminates any risk of corrosion, reduces likelihood of vibration and noise, is much simpler to manufacture, and allows integration of fastening portions in accordance with the teachings of the present invention (discussed below).

Figure 1:
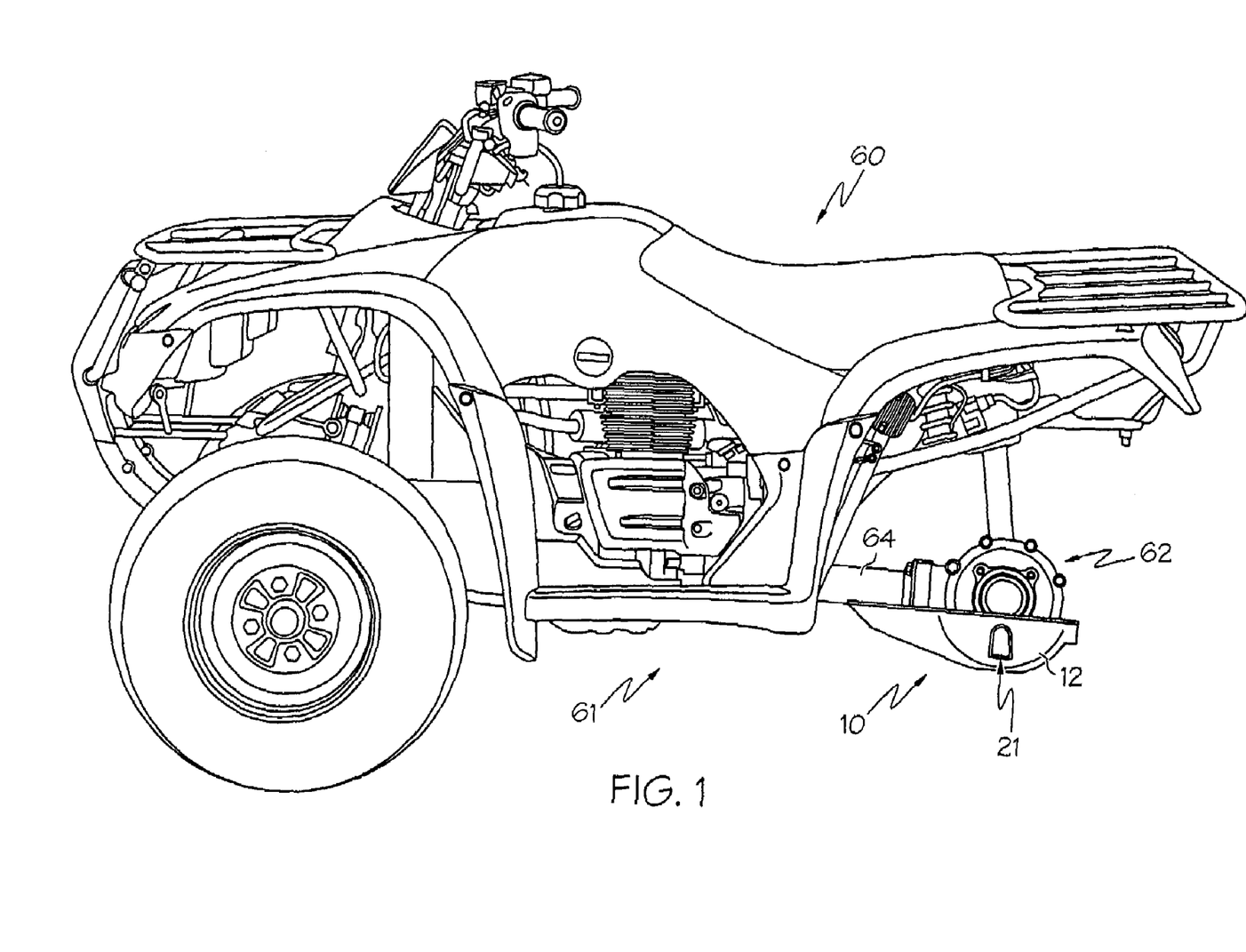
FIG. 1 is a side perspective view depicting an all terrain vehicle ("ATV") having a protective cover in accordance with one embodiment of the present invention.
Figure 2:
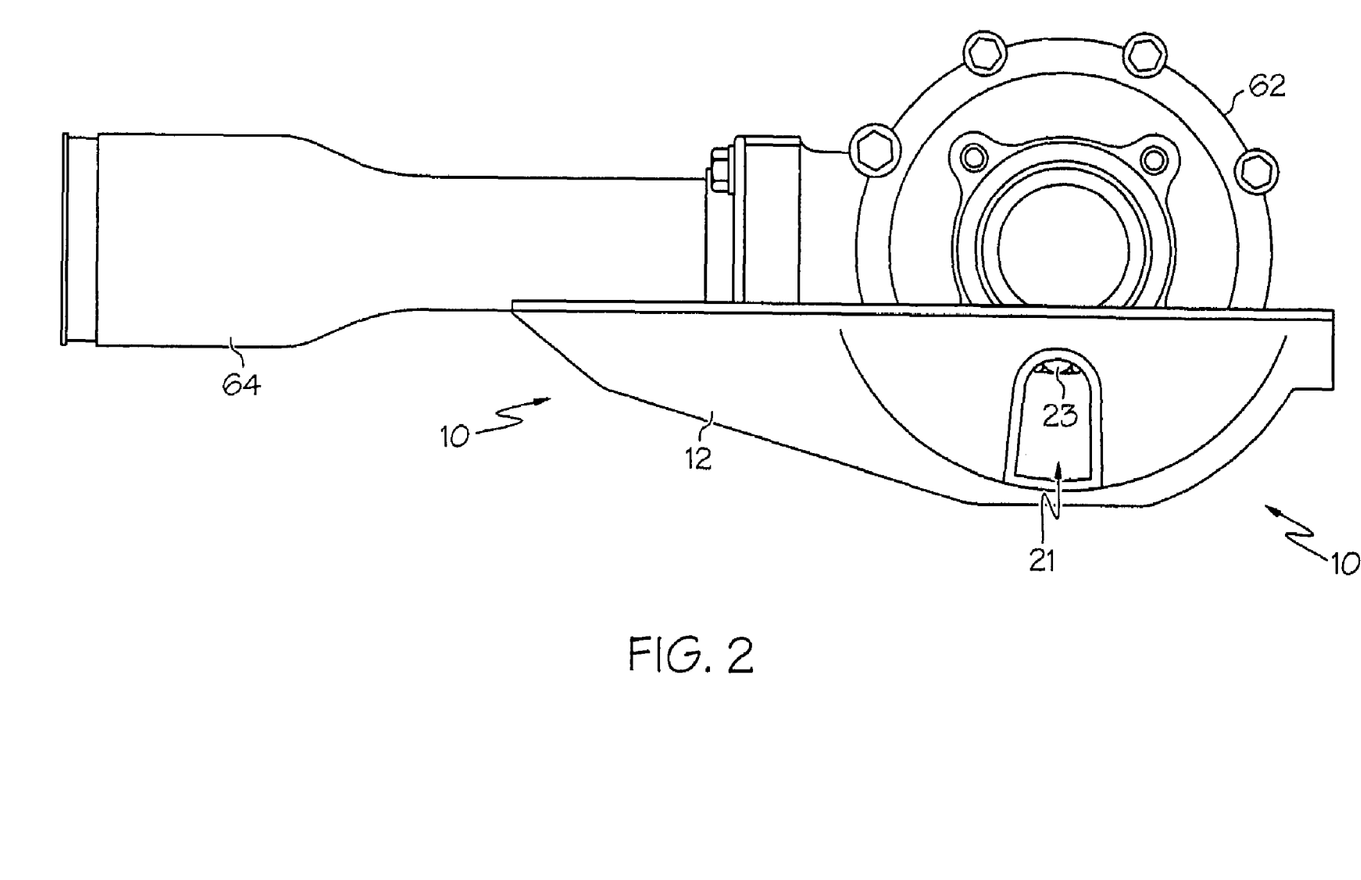
FIG. 2 is a side elevational view depicting the protective cover and a swing arm removed from the ATV of FIG. 1.

In one embodiment of the present invention, as illustrated in FIGS. 1-2, a protective cover 10 can be attached to a swing arm 64 of an ATV 60 for providing protection (e.g., as a skid plate) to a final drive gear case 62 of the ATV 60. For example, the final drive gear case 62 can comprise a differential or some other mechanical linkage with an ATV's axle(s). As ATVs are frequently exposed to terrain obstacles, a protective cover in accordance with the teachings of the present invention can provide particular advantages when used to protect features on the underside of an ATV. The protective cover 10 can be provided in any of a variety of shapes and sizes to facilitate its attachment to the ATV 60 and its protection of the final drive gear case 62 and/or other features on, or accessible from, an underside 61 of the ATV 60. For example, as illustrated in FIG. 3, the protective cover 10 may have a length L of from about thirty centimeters to about three meters, a width W of from about thirty centimeters to about two meters, and a depth D of from about five centimeters to about fifty centimeters, although other dimensions may be employed as desired.

Figure 3:
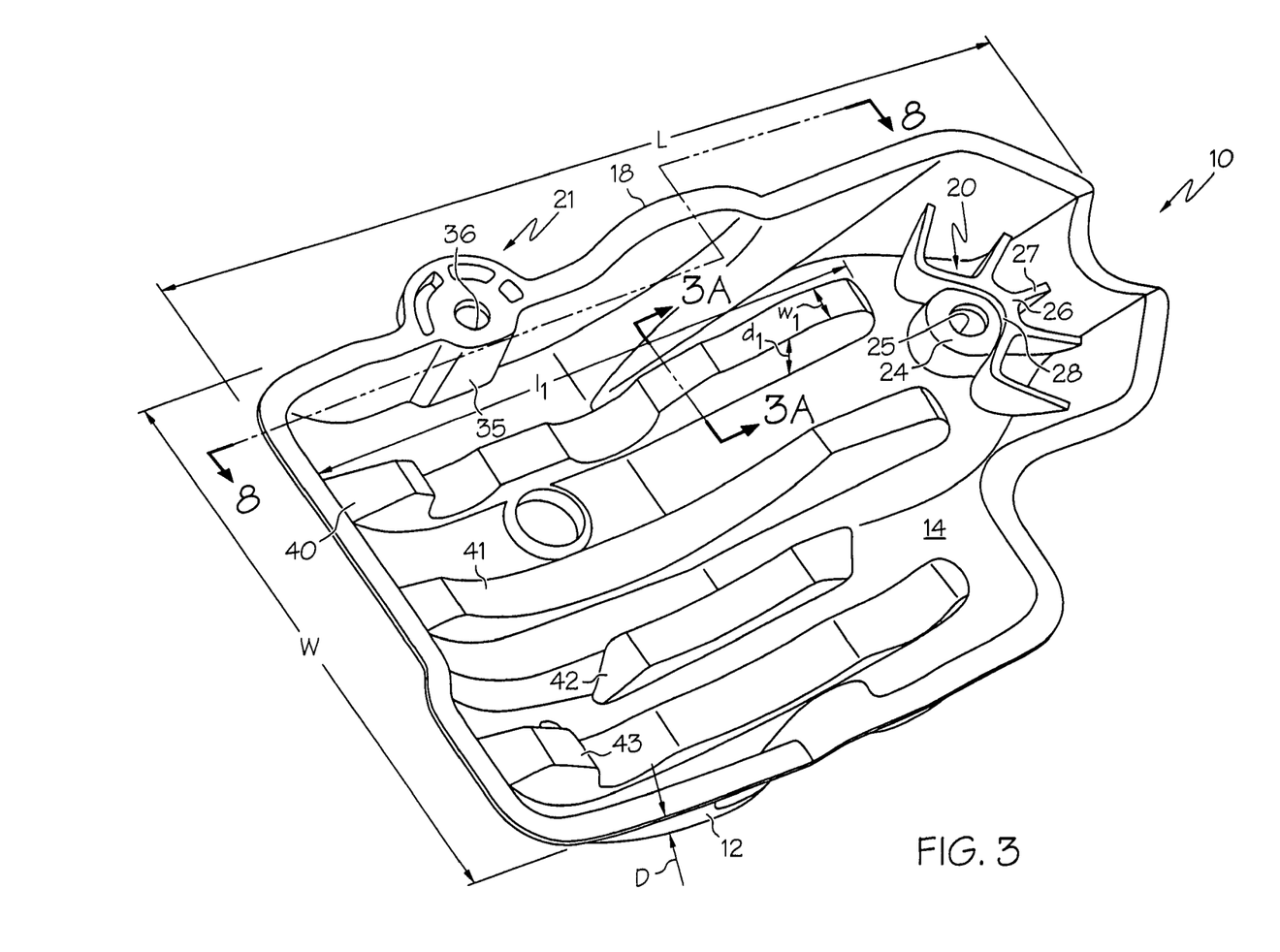
FIG. 3 is a top perspective view depicting the protective cover of FIG. 2 apart from the swing arm.

Referring to FIGS. 2-3, the protective cover 10 is shown to comprise a bottom surface 12, a top surface 14, a first fastening portion 20, and a second fastening portion 21. The first and second fastening portions 20, 21 are configured to facilitate attachment of the protective cover 10 to the underside 61 of the ATV 60. It will be appreciated that the protective cover 10 might also include additional fastening portions, and that an alternative protective cover in accordance with the teachings of the present invention can comprise a different arrangement of fastening portions that may or may not include the fastening portions 20 and/or 21. It will additionally be appreciated that a protective cover incorporating one or more fastening portions in accordance with the present invention can be attached to a vehicle through use of fewer fasteners, with less effort, and/or with greater strength and reliability as compared with a conventional plastic protective cover of similar size when attached to a similar vehicle.

Figure 4:
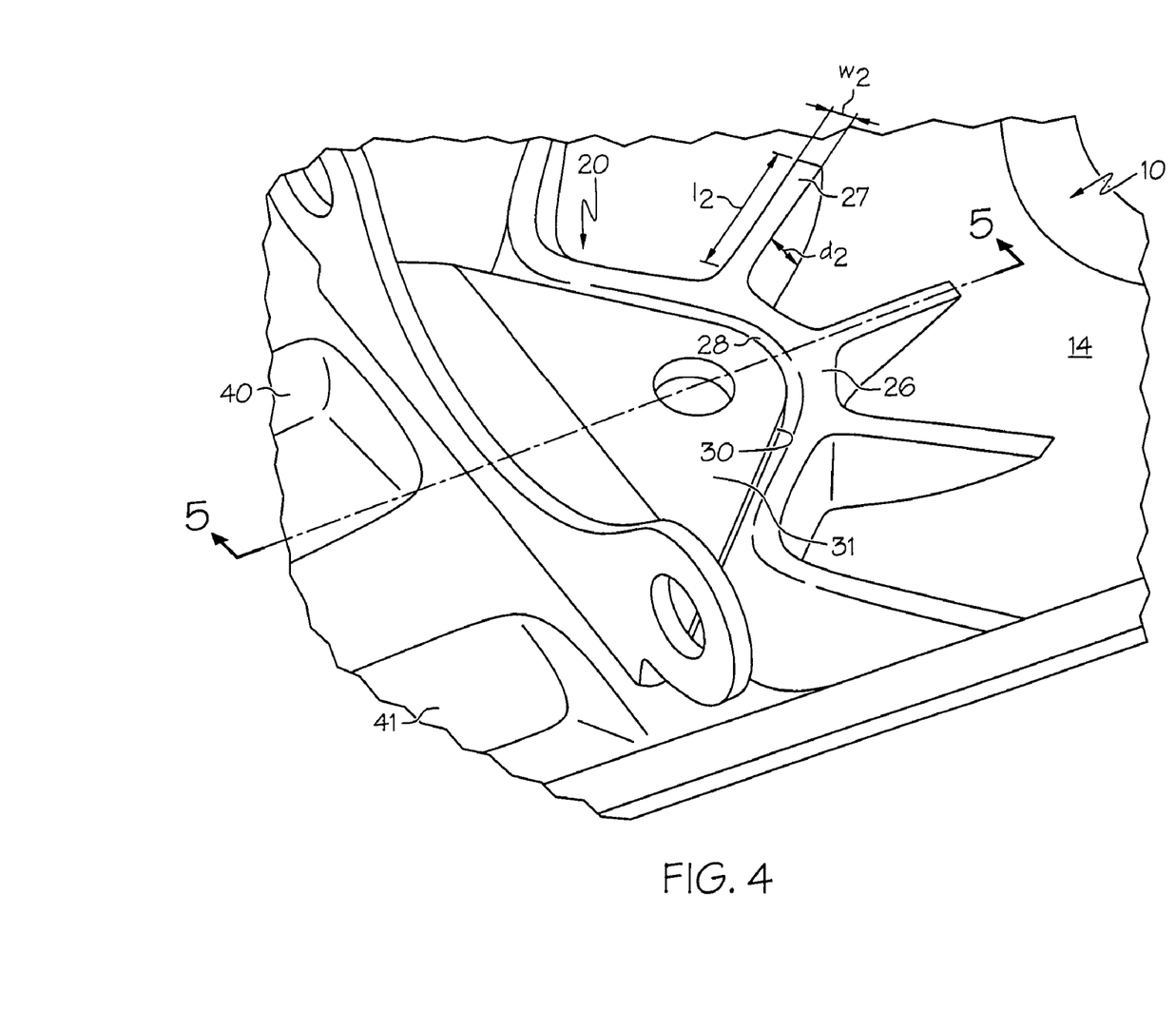
FIG. 4 is an enlarged perspective view depicting a portion of the protective cover of FIG. 3 in conjunction with a bracket in accordance with one embodiment of the present invention.
Figure 5:
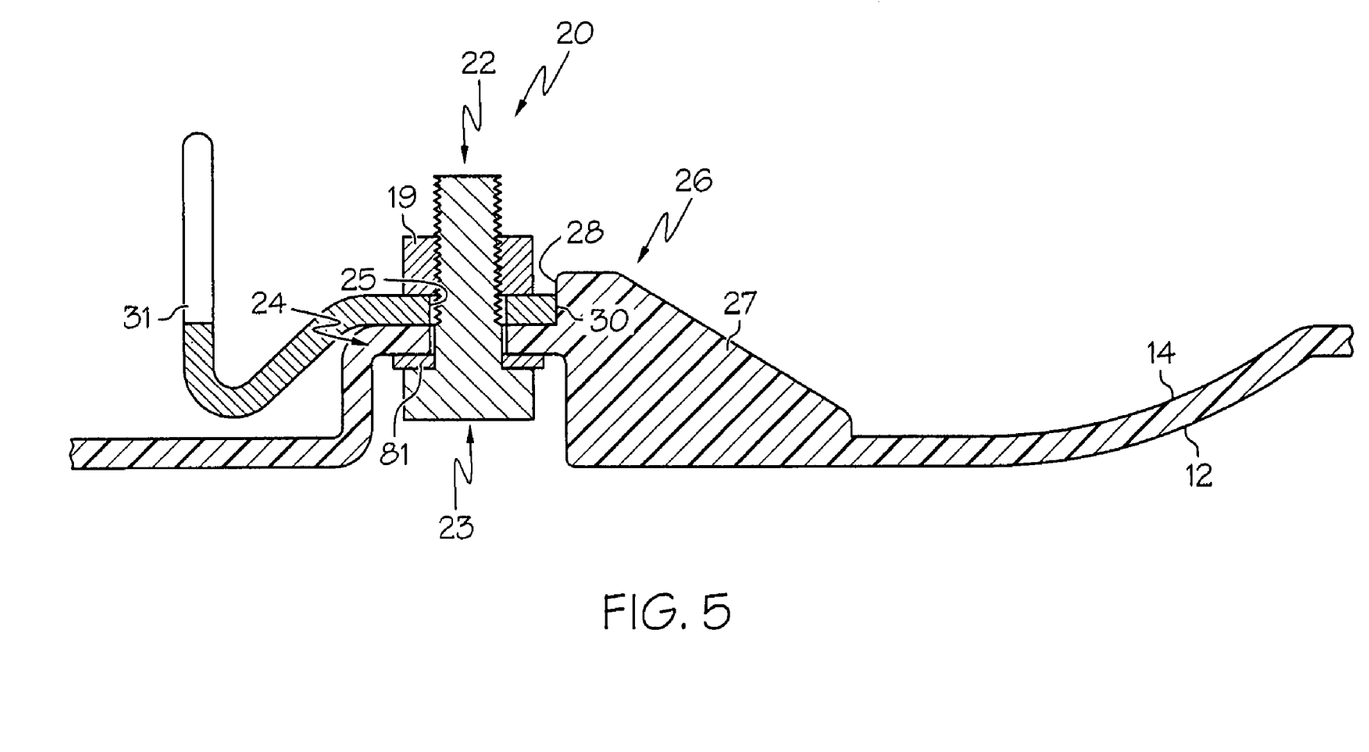
FIG. 5 is a cross-sectional view depicting the protective cover and bracket of FIG. 4 and taken along section lines 5-5 in FIG. 4.

As best shown in FIGS. 3-5, the first fastening portion 20 comprises a mounting structure 24 and an abutment structure 26. The mounting structure 24 can define an aperture 25 configured for receiving a fastener to facilitate attachment of the protective cover 10 to a vehicle (e.g., to a bracket 31 of the ATV 60). The fastener can comprise, for example, one or more bolts, screws, nuts, magnets, washers, and/or adhesives. In one particular embodiment, as shown in FIG. 5, the fastener is shown to comprise a bolt 22 (e.g., a shoulder bolt). The bolt 22 has a bolt head 23 which can include a washer 81. The washer 81 may be integral with the bolt 22 or may alternatively be provided separately for association with the bolt 22 to partially provide the bolt head 23. The mounting structure 24 is shown in FIG. 5 to be attached by the bolt 22 to the bracket 31, wherein the bracket 31 can be attached to the final drive gear case 62, the swing arm 64, or another component of the ATV 60. A nut 19 can be provided to receive the bolt 22 after the bolt 22 is passed through both the aperture 25 and the bracket 31. In one embodiment, the nut 19 can be attached (e.g., by welding) to the bracket 31, although the nut 19 might alternatively be provided separately from the bracket 31.

The bracket 31 includes a mounting wall 30, although it will be appreciated that a mounting wall in accordance with the teachings of the present invention could alternatively be provided by another component of the ATV 60. The abutment structure 26 is shown to define an abutment wall 28. The abutment wall 28 can be configured to contact the mounting wall 30 of the bracket 31 when the protective cover 10 is attached to the bracket 31 of the ATV 60. Regardless of how the mounting wall is provided upon a vehicle, it will be appreciated that the mounting wall and the abutment wall can both be sized and configured such that the abutment wall can contact the mounting wall over an extensive surface area as shown, for example, in FIG. 4. In one particular embodiment, the abutment wall 28 may contact the mounting wall 30 over about 60% of the surface area of the abutment wall 28. Additionally, although the abutment wall 28 is shown in FIGS. 4-5 to contact the mounting wall 30 at a generally vertical interface, it will be appreciated that the abutment wall 28 could alternatively contact the mounting wall 30 at any of a variety of angled or otherwise oriented interfaces.

When the ATV 60 is traveling in a forward direction and encounters a road obstacle that impacts and accordingly imposes loading, such as a shearing force (e.g., which pushes the protective cover 10 toward the rear of the ATV 60 when the ATV 60 travels in a forward direction), upon the protective cover 10, the loading can be transmitted to the bracket 31 substantially through the abutment wall 28 and the mounting wall 30, as opposed to merely by way of the fastener (e.g., bolt 22). Use of the abutment wall 28 and the mounting wall 30 for distribution of loading from the protective cover 10 to the ATV 60 provides a variety of benefits such as, for example, a reduction in the likelihood that a fastener (e.g., bolt 22) must sustain the entirety of the shearing force. As a result, the fastener (e.g., bolt 22) will be less likely to sustain damage, lose torque and/or fall out after repeated exposures of the protective cover 10 to impacts. It is additionally contemplated that the contact between the mounting wall 30 and the abutment wall 28 may transmit any of a variety of loadings, whether shearing forces or otherwise, to the ATV 60.

The first fastening portion 20 may further comprise at least one abutment rib and is shown in FIGS. 3-4 as including five abutment ribs (e.g., 27). Abutment ribs can reinforce the abutment structure 26 with respect to the fastening portion 20 and the remainder of the protective cover 10 and can therefore be configured to assist in transmitting loading (e.g., a shearing force) from the protective cover 10 to the ATV 60. In one embodiment, referring to FIG. 4, the abutment rib(s) (e.g., 27) extend in a direction away from the abutment wall 28. In another embodiment, the abutment ribs (e.g., 27) may have a length (e.g., $l_2$) of from about three centimeters to about twenty centimeters, a width (e.g., $w_2$) of from about one millimeter to about five centimeters, and a depth (e.g., $d_2$) ranging from zero to about twenty centimeters, although other dimensions may be employed as desired.

Figure 6:
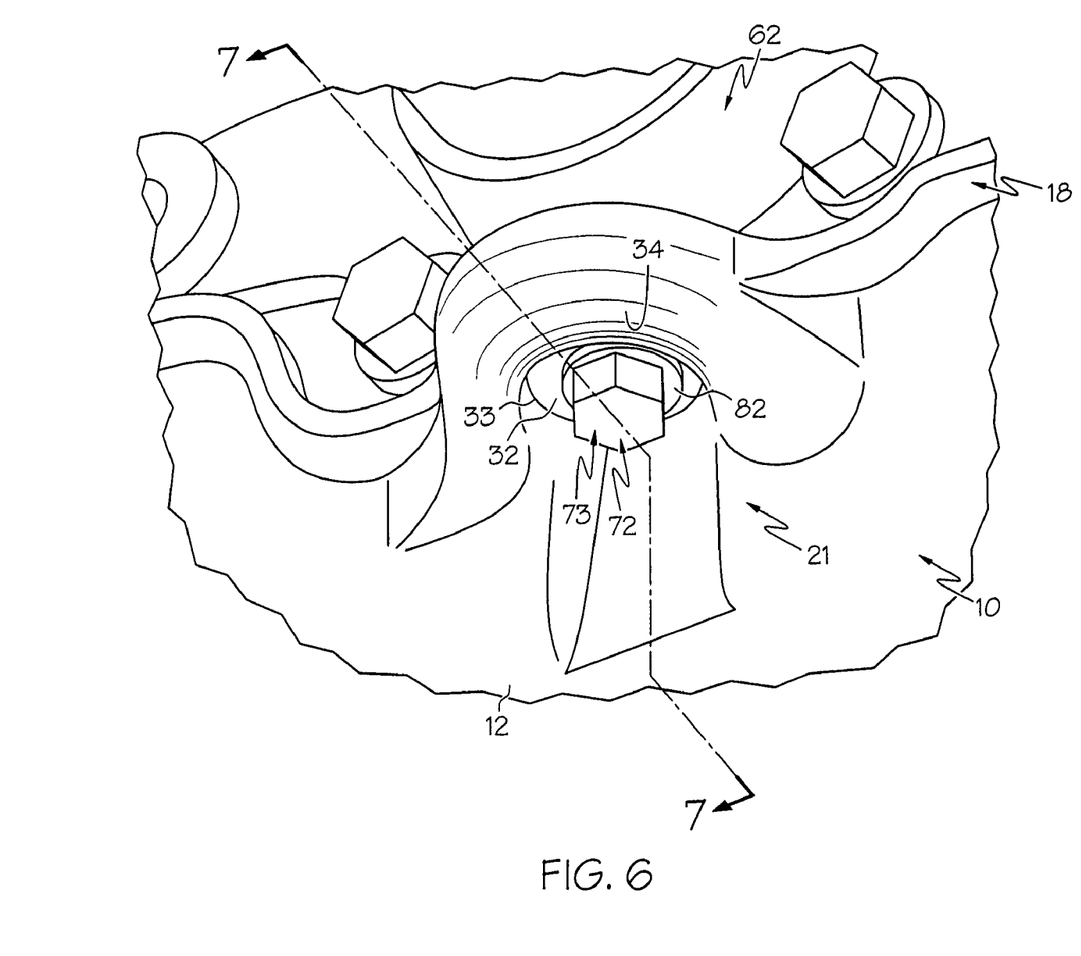
FIG. 6 is an enlarged bottom perspective view depicting a portion of the protective cover and the swing arm of FIG. 2.
Figure 7:
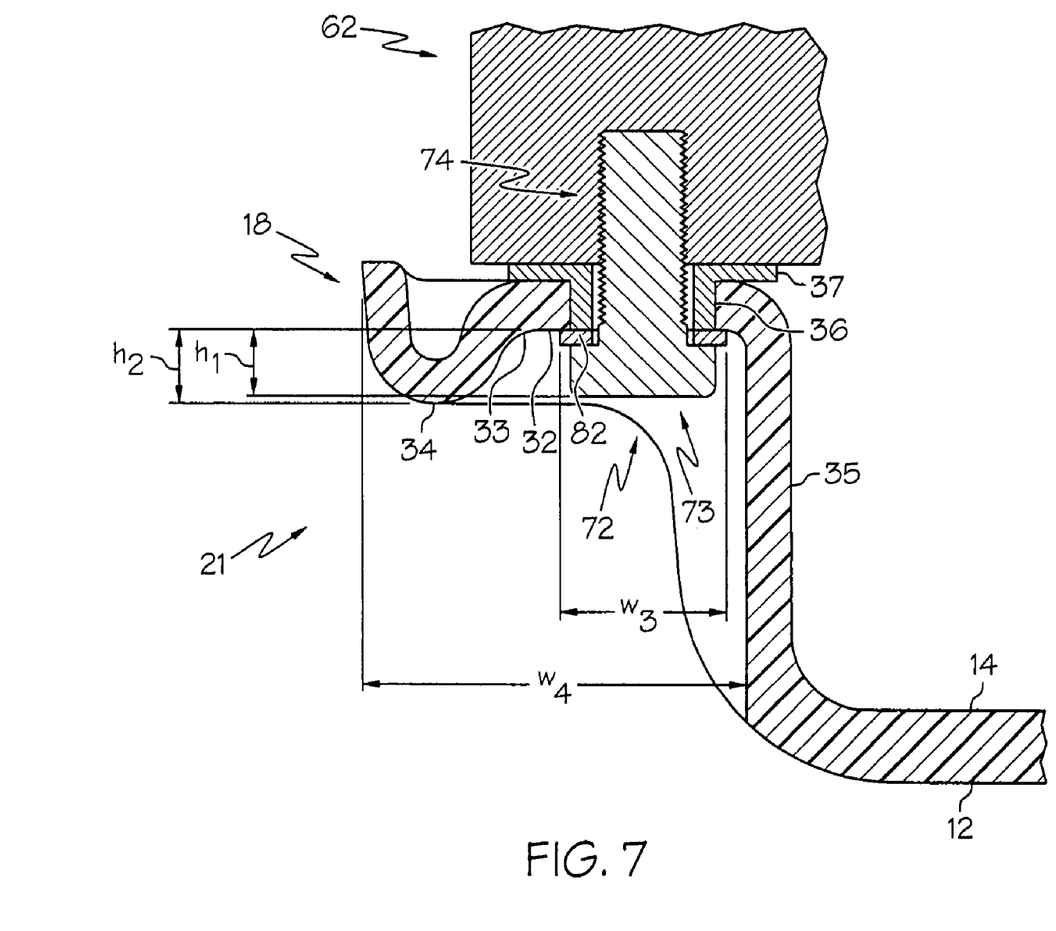
FIG. 7 is a cross-sectional view depicting the protective cover and a portion of the swing arm of FIG. 6 and taken along section lines 7-7 in FIG. 6.

The second fastening portion 21 includes a base 32 and a wall 34, as shown best in FIGS. 6-7. The base 32 can define an aperture 36 and can have a base perimeter 33 spaced from the aperture 36. The protective cover 10 may be configured for attachment to an underside of the ATV 60 by insertion of a fastener through the aperture 36 for engagement with a portion of the ATV 60 such as the final drive gear case 62. The fastener can comprise, for example, one or more bolts, screws, nuts, magnets, washers, and/or adhesives. In one particular embodiment, as shown in FIGS. 6-7, the fastener is shown to comprise a bolt 72. The bolt 72 has a bolt head 73, and the bolt head 73 is shown to comprise a washer 82. The washer 82 may be integral with the bolt 72 or may alternatively be provided separately for association with the bolt 72 to partially provide the bolt head 73. The bolt head 73 has a predetermined height $h_1$ and a predetermined width $w_3$, as shown in FIG. 7. In one embodiment, the predetermined height $h_1$ may be from about two millimeters to about ten millimeters and the predetermined width $w_3$ may be from about five millimeters to about three centimeters, although other dimensions maybe employed as desired. In order to secure the protective cover 10 to the ATV 60, an end of the bolt 72 can be inserted through the aperture 36 and a collar 37, and can then be threaded into a threaded aperture 74 provided in the final drive gear case 62, for example.

The second fastening portion 21 is located adjacent to an edge portion 18 of the protective cover 10. By providing the second fastening portion 21 adjacent to the edge portion 18 (as opposed to in a pocket in the center of the protective cover 10), the bolt head 73 can be more easily accessed for installation and removal of the bolt 72 from the protective cover 10.

Figure 8:
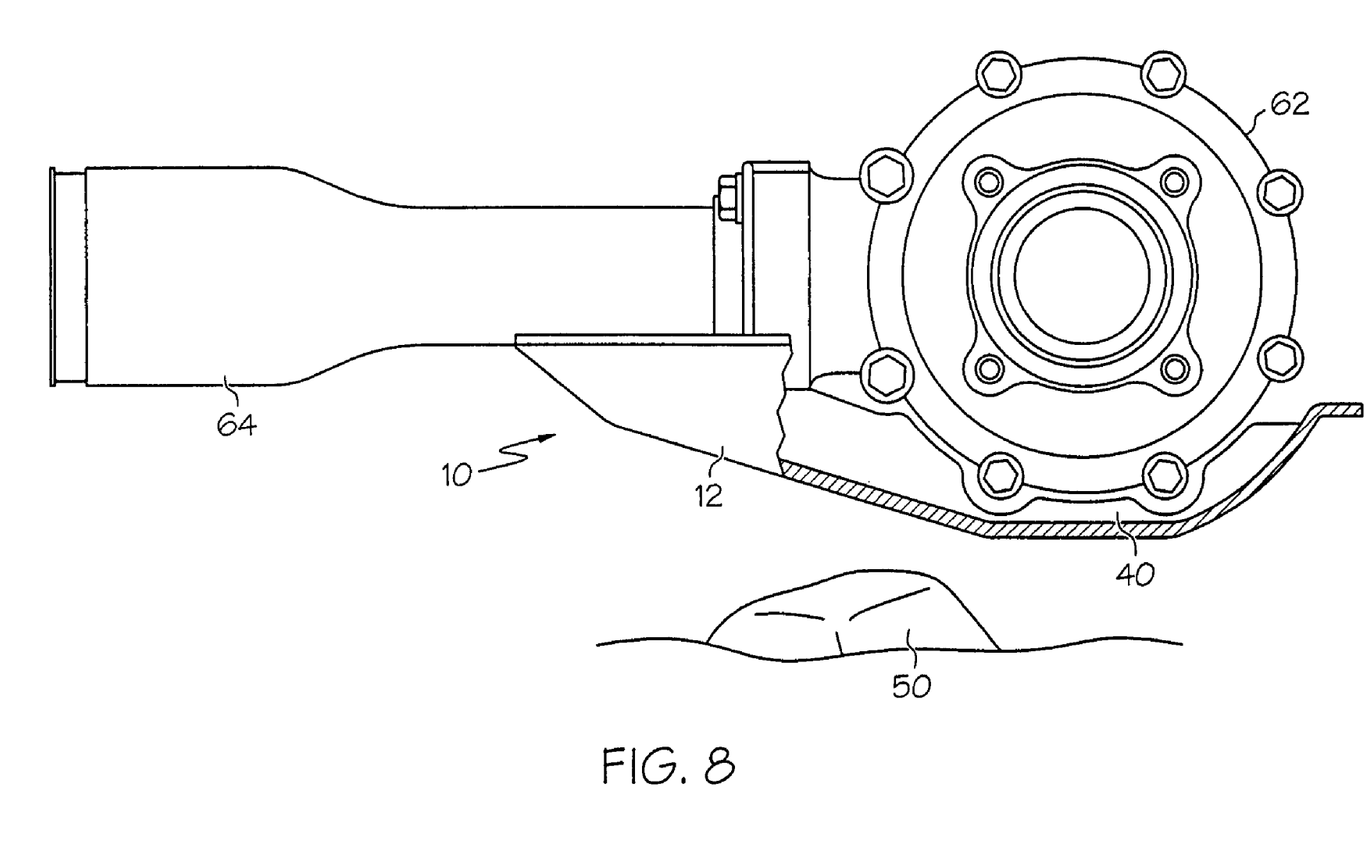
FIG. 8 is a side elevational view depicting the protective cover and swing arm of FIGS. 2-3, wherein the protective cover is partially represented in cross-section taken along section lines 8-8 in FIG. 3, and wherein a rib is illustrated in a first position.

As shown in FIGS. 3 and 7-8, for example, the second fastening portion 21 can actually form part of the edge portion 18 of the protective cover 10.

The wall 34 can extend from the base 32 around the base perimeter 33 at a height (e.g., at least to a height $h_2$) greater than the predetermined height $h_1$, as shown in FIGS. 6-7. This extension of the wall 34 can be substantially entirely or entirely around the base perimeter 33. Such a configuration makes it unlikely that a terrain obstacle could contact the bolt head 73. Also, this extension of the wall 34 can be in a direction substantially perpendicular to the extension of the base 32, as shown in FIG. 7, for example. In one embodiment of the present invention, a portion of the wall 34 can extend even higher than the height $h_2$. For example, as shown in FIGS. 3 and 6-7, a portion of the wall 34 extending around about half of the base perimeter 33 (part of which is shown to correspond with a portion 35 of the top surface 14) extends even higher than the height $h_2$ in order to define at least part of the depth D of the protective cover 10.

The wall 34 can additionally extend along substantially the entire length L of the protective cover 10. At least part of the wall 34 can be formed of relatively thick plastic so that it can wear away over time with ground contact, while still retaining sufficient material to protect the bolt head 73. The base 32 can have a width $w_4$ which is greater than the predetermined width $w_3$. The base perimeter 33 can also have a width which is greater than the predetermined width $w_3$. In one particular embodiment, the height $h_2$ can be from about two centimeters to about thirty centimeters and the width $w_4$ can be from about one centimeter to about five centimeters. The height $h_2$ of the wall 34 provides protection for the head 73 of the fastener 72 from contact with terrain obstacles. Accordingly, by surrounding the head 73 of the fastener 72 with the wall 34, it will be appreciated that terrain obstacles will be less likely to contact or damage the head 73 of the fastener 72 than if the wall 34 were not present. It would be difficult or costly to incorporate such a fastening portion into a conventional metal protective cover as metal cannot be formed into such shapes as readily as can plastic. Also, the ability to incorporate more complex shapes into a plastic protective cover enables use of more standard types of fasteners (e.g., with external wrenching portions such as hex headed bolts) which are not typically suitable for effective use with steel protective covers due to the inability of the steel protective covers to adequately protect such fasteners.

Figure 3A:
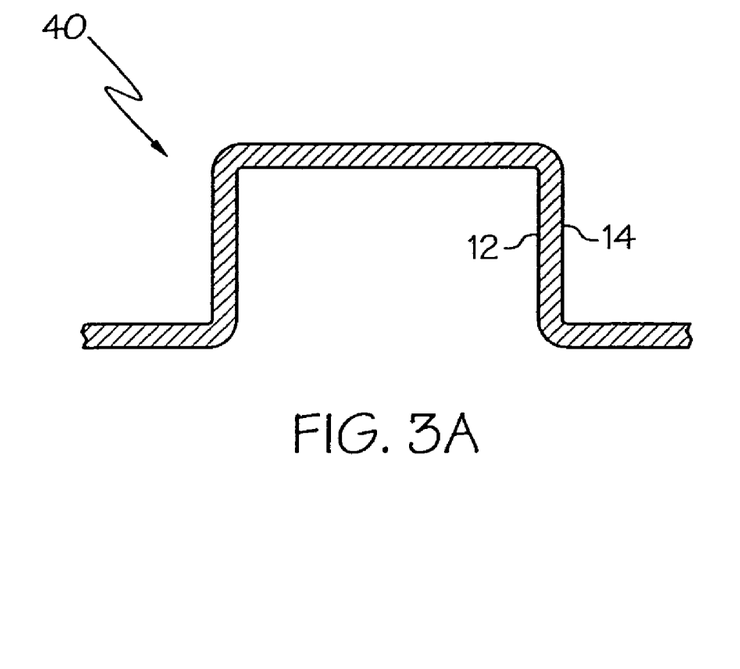
FIG. 3A is a sectional view depicting a portion of the protective cover of FIG. 3 including a rib and taken along section lines 3A-3A in FIG. 3.
Figure 3B:
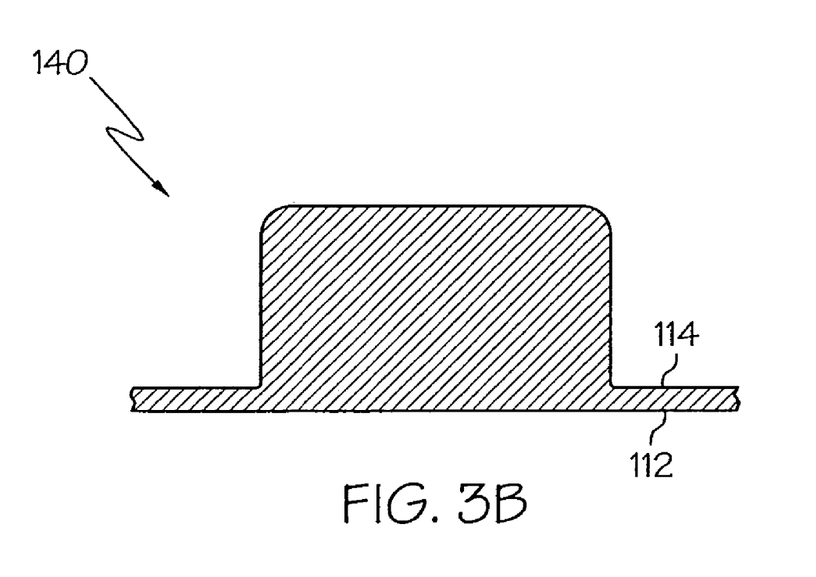
FIG. 3B is a sectional view depicting a portion of a protective cover including a rib in accordance with another embodiment of the present invention.

A protective cover in accordance with the teachings of the present invention can also include one or more ribs (e.g., 40, 41, 42, 43) which can be formed in a protective cover in any of a variety of suitable configurations. For example, referring to the sectional view of the rib 40 depicted in FIG. 3A, the rib 40 can be formed as an upward indentation in the protective cover 10, wherein both the top surface 14 and the bottom surface 12 are deflected upwardly to form the rib 40. In one embodiment, as shown in FIG. 3A, the top surface 14 and the bottom surface 12 can remain substantially evenly spaced from one another throughout the entirety of the rib 40 so that the plastic forming the rib has an even thickness. In another embodiment, however, the thickness of the rib may vary. FIG. 3B depicts a sectional view of an alternate rib 140 wherein the rib 140 is formed by providing plastic of greater thickness in the area of the rib 140 such that the top surface 114 is directed upwardly to provide the rib 140 while the bottom surface 112 is unchanged in the area of the rib 140. A rib in accordance with the teachings of the present invention can have any of a variety of alternative configurations.

In one embodiment, the protective cover 10 may include between one and six ribs. For example, the protective cover 10 of FIG. 4 is shown to include four ribs 40, 41, 42, and 43 which comprise protrusions configured to extend toward an underside of a vehicle. The bottom surface 12 may or may not include indentations corresponding to the ribs 40, 41, 42 and 43. As illustrated in FIG. 3, in one embodiment, the rib 40 may have a length $l_1$ of from about three centimeters to about one meter, a width $w_1$ of from about one millimeter to about ten centimeters, and a depth $d_1$ ranging from zero to about twenty centimeters, although ribs of other dimensions may be employed as necessary or desired. One or more of the ribs can be shaped and configured so as to follow and/or substantially mirror the contours of one or more features of the vehicle (e.g., the final drive gear case 62) positioned above it and adjacent to it. In this manner, if the rib were to move toward that feature upon impact of the protective cover with a terrain obstacle, the rib would matingly contact that feature (i.e., the rib would contact that feature in a predetermined manner).

Figure 9:
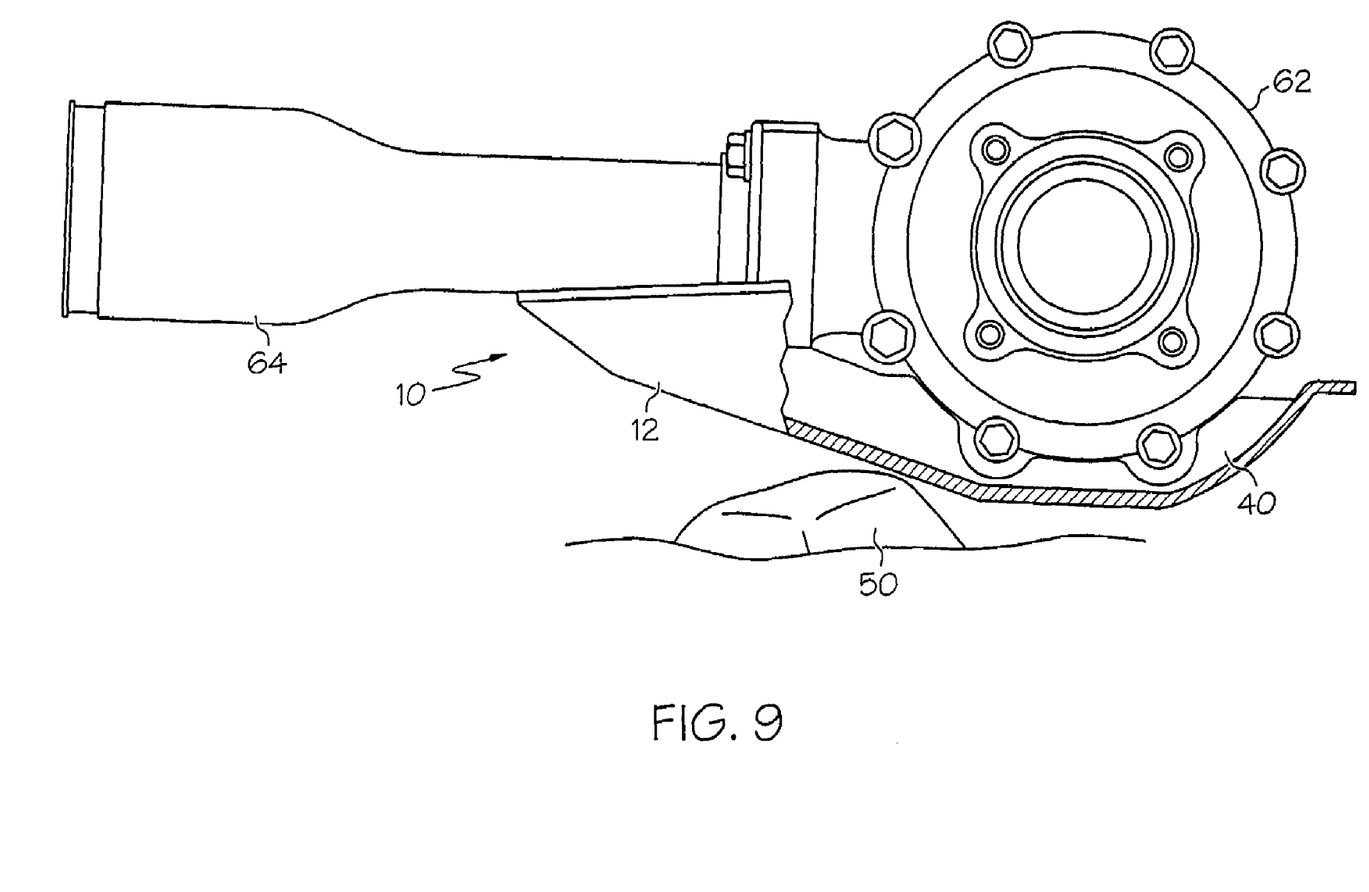
FIG. 9 is a side elevational view depicting the protective cover and swing arm of FIGS. 2-3, wherein the protective cover is partially represented in cross-section taken along section lines 8-8 in FIG. 3, and wherein the rib is illustrated in a second position.

For example, the rib 40 may be movable from a first position, illustrated in FIG. 8, to a second position, illustrated in FIG. 9, upon impact of the bottom surface 12 of the protective cover 10 against a terrain obstacle (e.g., a rock 50). The plastic forming the protective cover 10 can exhibit flex upon impact, thereby providing a cushioning effect to the ATV 60 for any impact received from a terrain obstacle. The amount of flex, and thus cushioning, can be significantly greater than that provided by a conventional protective cover, and can be largely provided by the ribs (e.g., 40, 41, 42, 43). It will be appreciated that a protective cover having ribs extending along a longitudinal axis of a vehicle (e.g., as shown in FIGS. 1-3) can have increased stiffness as compared to conventional protective covers. However, while such a protective cover can provide significant stiffness in a direction along the longitudinal axis of the vehicle (i.e., front to back), it can still allow significant bending in a direction perpendicular to the longitudinal axis of the vehicle (i.e., side to side). Although the ribs 40, 41, 42, and 43 are shown to extend substantially along the longitudinal axis of the ATV 60, it will be appreciated that a protective cover might alternatively include rib(s) oriented differently with respect to the longitudinal axis of an ATV and that the ability of the protective cover to flex can vary accordingly.

The rib 40 can be shaped and configured to matingly contact the final drive gear case 62 on the underside 61 of the ATV 60 when the rib 40 is in the second position (e.g., shown in FIG. 9) so that loading from an impact to the protective cover 10 is distributed in a predetermined manner from the protective cover 10 to the final drive gear case 62. However, the rib 40 can be spaced from the final drive gear case 62 when in the first position (e.g., shown in FIG. 8) so that unnecessary rubbing, vibration, and/or noise can be avoided that might otherwise exist if these items were allowed to remain in contact during normal use of the ATV 60.

Advantageously, in this embodiment, impact loading can be distributed in a predetermined manner and dissipated across a predetermined portion of the protective cover 10 and the final drive gear case 62 without resulting in significant damage to either the protective cover 10 or the final drive gear case 62. The lack of significant damage to the protective cover 10 or final drive gear case 62 results from the rib 40 contacting the final drive gear case 62 over a relatively large area so that the impact is spread across a relatively large area of the final drive gear case 62. It will also be appreciated that a rib in accordance with the teachings of the present invention could be shaped and configured to matingly contact any of a variety of other features of a vehicle in a predetermined manner upon impact to a corresponding protective cover. It will also be appreciated that the ability of a protective cover to bend or flex in a particular direction can be adjusted through strategic incorporation of ribs into the protective cover.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle comprising:
an underside;
a feature on the underside, the feature having a contour; and
a protective cover formed substantially from plastic, the protective cover being flexible upon impact; wherein
the protective cover is attached to the underside;
the protective cover comprises a bottom surface, an edge portion, at least one fastening portion, a first rib and a second rib, the second rib being laterally spaced from the first rib, at least a portion of each of the first rib and the second rib being laterally spaced from the edge portion, each of the first rib and second rib extending upwardly toward the underside; and
at least one of the first rib and second rib is movable from a first position below and spaced apart from the feature to a second position upon impact of the bottom surface against a terrain obstacle and is shaped and configured to substantially mirror the contour of the feature to matingly contact the feature on the underside of the vehicle when the at least one of the first rib and the second rib is in the second position so that loading from the impact is distributed in a predetermined manner from the protective cover to the feature.

2. The vehicle of claim 1 wherein the feature comprises a final drive gear case.

3. The vehicle of claim 2 further comprising:
a swing arm; wherein
the vehicle is an all terrain vehicle and the protective cover is attached to the swing arm.

4. The vehicle of claim 1, wherein:
at least a portion of the at least one of the first rib and the second rib comprises a generally inverted-U transverse cross-sectional shape.

5. A vehicle comprising:
an underside;
a feature on the underside, the feature having a contour; and
a protective cover formed substantially from plastic, the protective cover being flexible upon impact; wherein
the protective cover is attached to the underside;
the protective cover comprises a bottom surface, at least one fastening portion and a rib, the rib extending upwardly toward the underside; and
the rib is movable from a first position below and spaced apart from the feature to a second position upon impact of the bottom surface against a terrain obstacle and is shaped and configured to substantially mirror the contour of the feature to matingly contact the feature on the underside of the vehicle when the rib is in the second position so that loading from the impact is distributed in a predetermined manner from the protective cover to the feature;
said fastening portion comprises a first fastening portion, the first fastening portion comprises a mounting structure and an abutment structure, the abutment structure defines an abutment wall, the mounting structure is configured to accommodate a fastener for attachment of the protective cover to a vehicle, and the first fastening portion is configured such that the abutment wall is operable to contact a mounting wall provided upon a vehicle when the protective cover is mounted on a vehicle and to substantially transmit to a vehicle a shearing load imparted upon the protective cover by a terrain obstacle.

6. The vehicle of claim 5 wherein said fastening portion further comprises a second fastening portion, the second fastening portion is adjacent to an edge portion of the protective cover and includes a base and a wall, the base defines an aperture and has a base perimeter spaced from the aperture, the protective cover is configured for attachment to an underside of a vehicle via the aperture by a fastener including a head having a predetermined height and a predetermined width, the wall extends from the base around the base perimeter at a height greater than the predetermined height, and the base has a width greater than the predetermined width.

7. A vehicle comprising:
an underside;
a feature on the underside, the feature having a contour; and
a protective cover formed substantially from plastic, the protective cover being flexible upon impact; wherein
the protective cover is attached to the underside;
the protective cover comprises a bottom surface, at least one fastening portion and a rib, the rib extending upwardly toward the underside; and
the rib is movable from a first position below and spaced apart from the feature to a second position upon impact of the bottom surface against a terrain obstacle and is shaped and configured to substantially mirror the contour of the feature to matingly contact the feature on the underside of the vehicle when the rib is in the second position so that loading from the impact is distributed in a predetermined manner from the protective cover to the feature;
the vehicle further comprises a first fastener and a bracket having a mounting wall, wherein said fastening portion comprises a first fastening portion, the first fastening portion comprises a mounting structure and an abutment structure, the abutment structure defines an abutment wall, the mounting structure accommodates the first fastener which attaches the protective cover to the bracket, and the first fastening portion is configured such that the abutment wall contacts the mounting wall and is operable to substantially transmit to the bracket a shearing load imparted upon the protective cover by a terrain obstacle.

8. The vehicle of claim 7 further comprising a second fastener including a head having a predetermined height and a predetermined width, wherein said fastening portion further comprises a second fastening portion, the second fastening portion is adjacent to an edge portion of the protective cover and includes a base and a wall, the base defines an aperture and has a base perimeter spaced from the aperture, the protective cover is attached to an underside of the vehicle by the second fastener and via the aperture, the wall extends from the base around the base perimeter at a height greater than the predetermined height, and the base has a width greater than the predetermined width.

9. A vehicle comprising:

an underside;

a feature on the underside, the feature having a contour; and a protective cover formed substantially from plastic, the protective cover being flexible upon impact; wherein the protective cover is attached to the underside;

the protective cover comprises a bottom surface, at least one fastening portion and a rib, the rib extending upwardly toward the underside;

the rib is movable from a first position below and spaced apart from the feature to a second position upon impact of the bottom surface against a terrain obstacle and is shaped and configured to substantially mirror the contour of the feature to matingly contact the feature on the underside of the vehicle when the rib is in the second position so that loading from the impact is distributed in a predetermined manner from the protective cover to the feature; and a fastener including a head having a predetermined height and a predetermined width, wherein the fastening portion is adjacent to an edge portion of the protective cover and includes a base and a wall, the base defines an aperture and has a base perimeter spaced from the aperture, the protective cover is attached to an underside of the vehicle by the fastener and via the aperture, the wall extends from the base around the base perimeter at a height greater than the predetermined height, and the base has a width greater than the predetermined width.

10. A protective cover for an underside of a vehicle, the protective cover formed substantially from plastic and comprising:

at least one fastening portion configured to facilitate attachment of the protective cover to a vehicle, said fastening portion comprising a mounting structure and an upwardly extending abutment structure, the abutment structure defining an abutment wall, the abutment wall extending above the mounting structure, the mounting structure configured to accommodate a fastener for attachment of the protective cover to a vehicle, wherein said fastening portion is configured such that the abutment wall is operable to contact a mounting wall provided upon a vehicle when the protective cover is mounted on a vehicle and to substantially transmit to a vehicle a shearing load imparted upon the protective cover by a terrain obstacle; and at least one abutment rib configured to reinforce the abutment structure with respect to the remainder of the protective cover; wherein the at least one abutment rib is integral with and extends away from the abutment structure.

11. The protective cover of claim 10 wherein the mounting structure defines an aperture configured for receiving a fastener for attachment of the protective cover to a vehicle.

12. The protective cover of claim 10 wherein said fastening portion further comprises a second fastening portion, the second fastening portion is adjacent to an edge portion of the protective cover and includes a base and a wall, the base defines an aperture and has a base perimeter spaced from the aperture, the protective cover is configured for attachment to an underside of a vehicle via the aperture by a fastener including a head having a predetermined height and a predetermined width, the wall extends from the base around the base perimeter at a height greater than the predetermined height, and the base has a width greater than the predetermined width.

13. A vehicle comprising the protective cover of claim 10.

14. The vehicle of claim 13 comprising an all-terrain vehicle.

15. The vehicle of claim 13 further comprising a fastener including a head having a predetermined height and a predetermined width, wherein said fastening portion further comprises a second fastening portion, the second fastening portion is adjacent to an edge portion of the protective cover and includes a base and a wall, the base defines an aperture and has a base perimeter spaced from the aperture, the protective cover is attached to an underside of a vehicle by the fastener and via the aperture, the wall extends from the base around the base perimeter at a height greater than the predetermined height, and the base has a width greater than the predetermined width.

16. The protective cover of claim 10, wherein:

the abutment wall at least partially circumscribes the mounting structure.

17. The protective cover of claim 16, wherein:

the abutment wall is integral with the mounting structure.

* * * * *